US007502811B2

(12) United States Patent
Lei

(10) Patent No.: US 7,502,811 B2
(45) Date of Patent: Mar. 10, 2009

(54) DEFER CONTAINER-MANAGED PERSISTENCE OPERATIONS ON TRANSACTIONAL OBJECTS

(75) Inventor: Yang Lei, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 611 days.

(21) Appl. No.: 10/887,082

(22) Filed: Jul. 8, 2004

(65) Prior Publication Data

US 2006/0010171 A1 Jan. 12, 2006

(51) Int. Cl.
*G06F 17/30* (2006.01)
(52) U.S. Cl. ...................................... 707/200
(58) Field of Classification Search .................. 707/200
See application file for complete search history.

(56) References Cited

U.S. PATENT DOCUMENTS

| 6,269,373 | B1 | 7/2001 | Apte et al. ..................... 707/10 |
| 6,542,885 | B1 | 4/2003 | Nally ............................. 707/2 |
| 6,557,100 | B1 | 4/2003 | Knutson ..................... 713/100 |
| 6,684,387 | B1 | 1/2004 | Acker et al. ................ 717/126 |
| 6,769,124 | B1* | 7/2004 | Schoening et al. .......... 719/316 |
| 2001/0023402 | A1 | 9/2001 | Flynn .......................... 707/10 |
| 2002/0073080 | A1* | 6/2002 | Lipkin ........................... 707/3 |
| 2002/0120697 | A1* | 8/2002 | Generous et al. ........... 709/206 |
| 2003/0051102 | A1* | 3/2003 | Jacobs et al. ................ 711/145 |
| 2003/0056022 | A1 | 3/2003 | Carlson et al. ............. 709/315 |
| 2003/0065827 | A1 | 4/2003 | Skufka et al. .............. 709/315 |
| 2003/0115376 | A1 | 6/2003 | Drobychev et al. ......... 709/328 |
| 2003/0149689 | A1 | 8/2003 | Chow et al. .................... 707/3 |
| 2003/0182550 | A1 | 9/2003 | Chen et al. ................. 713/167 |
| 2003/0182651 | A1 | 9/2003 | Secrist et al. .............. 717/120 |
| 2003/0200526 | A1 | 10/2003 | Arcand ....................... 717/102 |
| 2003/0212987 | A1 | 11/2003 | Demuth et al. .............. 717/130 |
| 2006/0069751 | A1* | 3/2006 | Felt et al. ..................... 709/219 |

OTHER PUBLICATIONS

Mahapatra, Sanja "Transaction Management under J2EE.12," JavaWorld, at http://www.javaworld.com (Jul. 2000).
Raj, Gopalan Suresh "Enterprise Java Beans" WebCornucopia, at http://members.tripod.com/gsraj/ejb (last updated Dec. 19, 1998).
Johnson, Mark, "A beginner's guide to Enterprise JavaBeans", JavaWorld, at http://www.javaworld.com (Oct. 1998).

(Continued)

*Primary Examiner*—Hosain T Alam
*Assistant Examiner*—Johnese Johnson
(74) *Attorney, Agent, or Firm*—Duke W. Yee; Bruce Clay; Rudolf O. Siegesmund

(57) ABSTRACT

The invention controls the persistence of server component objects during a transaction, thereby minimizing the number of times that a program accesses a database. The invention also minimizes the number of operations needed. The invention caches the database operations required to persist server component objects until a client object program commits the transaction or until the program needs to access the server component objects. The invention comprises an improved container program that creates server component objects, associates each server component object with a transaction, maintains the server component objects in a cache, filters out unnecessary database operations and then flushes the cache at the appropriate time so that a server component object is persisted only when a client program commits an associated transaction or another object attempts to access the server component object.

3 Claims, 11 Drawing Sheets

OTHER PUBLICATIONS

Research Disclosure "Managing Classes and Interfaces of an Enterprise JavaBean Component", No. 42182, p. 668, May 1999.
Research Disclosure "Code Generated for Supporting Associations Between EJB's at EJB Creation Time", No. 429136, Jan. 2000.
Research Disclosure "A Technique for Virtually Expanding Queryable EJB CMP Entity Bean Fields", No. 454165, Feb. 2002.
Research Disclosure "A Reuse Mechanism for Object Containers", No. 443135, Mar. 2001.

* cited by examiner

DEFER CONTAINER-MANAGED PERSISTENCE OPERATIONS ON TRANSACTIONAL OBJECTS

CROSS-REFERENCE TO RELATED APPLICATION

The present invention is related to the subject matter of U.S. patent application Ser. No. 10/886,894, incorporated herein by reference.

FIELD OF THE INVENTION

The present invention generally relates to data processing apparatus and corresponding methods for managing data stored in a database. In particular, the present invention relates to managing operations on transactional data objects persisted in a database.

BACKGROUND OF THE INVENTION

A "transaction" is a familiar concept to most people. A common example of a transaction is buying groceries: a consumer puts one or more items in a cart, takes the cart to the checkout register, and pays for the items. If the consumer fails to carry out any of these "operations," such as taking the cart to the checkout register, then the whole transaction fails. This example is analogous to online shopping as well: a consumer browses a website for books, puts one or more books in a virtual cart, clicks the "buy" button, and pays for the books. Both examples can be distilled or expanded to include additional operations, such as a bank debiting the consumer's account as part of the payment operation, or the online merchant updating inventory after the consumer pays. In general terms, though, a "transaction" can be, and often is, characterized as an individual unit of work comprised of several operations. See Sanjay Mahapatra, *Transaction Management under J2EE 1.2*, JavaWorld, at http://www.javaworld.com (July 2000), incorporated herein by reference. Naturally, computers have come to play a large role in implementing transaction processing. Using computers to manage transactions, though, requires substantial programming efforts at varying levels, which include the business operations level and the data processing levels.

While neither the concept of a "transaction" nor the use of computers to implement transaction processing is new, the methods used to implement such transaction processing has seen rapid change in recent years. In particular, advances in client/server and object-oriented technologies have changed transaction processing significantly.

In recent years the traditional two-tier client/server system has been slowly displaced by more sophisticated multi-tier client/server systems. In general, a multi-tier system places at least one intermediate component between the client and the server. These components are referred to commonly as "middleware." Generalized "n-tier" systems include n layers of software that provide a different layer of services at varying levels of detail to the layers above and beneath them, where n is any number. See Mark Johnson, *A beginner's guide to Enterprise JavaBeans*, JavaWorld, at http://www.javaworld.com (October 1998), incorporated herein by reference. Programmers often use multiple client/server tiers in transactional processing to separate and delegate the programming tasks required for managing a transaction. In particular, one tier usually includes objects that implement the business operations while one or more other tiers provide objects that implement the underlying data processing (such as creating a data structure to represent the cart or saving the consumer's order to a database).

"Object-oriented" languages and techniques also have become increasingly popular in recent years. In general, an "object" is a named memory unit that contains data and instructions for manipulating that data. In an object-oriented context, the term "attribute" or "property" generally refers to the data within the memory unit, and the term "method" or "procedure" refers to the related instructions for manipulating the data. In practice, objects often include methods that direct the process of storing the object's attributes within a file or database. Of course, an object that includes such a method also generally includes one or more methods that direct other types of operations, such as updating or removing attributes from the file or database. In transactional processing, then, objects can represent the attributes of physical entities within the transaction (such as a grocery item or book), as well as implement the business operations in any given transaction (such as putting a grocery item or book in a cart).

Today, computer programmers frequently implement transaction processing with a mix of n-tiered architectures and object-oriented technology. Sun Microsystems, Inc. (SUN) has developed a comprehensive collection of objects and other supporting programs that programmers can use to build sophisticated transaction processing systems. SUN markets this collection as the JAVA 2 ENTERPRISE EDITION (J2EE) platform. SUN also has developed an application program interface (API) for J2EE that defines an n-tiered architecture, which SUN markets as the ENTERPRISE JAVABEANS (EJB) architecture.

Generally, an EJB architecture comprises an EJB server, an EJB container, an EJB component (also commonly known as a "bean), an EJB object, and a database. An EJB component, which typically implements business operations, executes within an EJB container. EJB components also must have a "home interface" through which an EJB object can create, initialize, remove, and find a specific instance of an EJB component. The methods that a home object implements to find a specific instance of an EJB component and retrieve data are known as "finder" methods. The EJB container, which implements many of the data processing operations, executes within an EJB server. According to SUN's specification, an EJB container also must be able to manage transactions. The EJB server generally executes within any given computer's native environment. An EJB object, though, allows client programs to execute the EJB component, through the EJB component's EJB container. FIG. 1 depicts a typical EJB system architecture. Generally, each of these EJB subsystems comprises one or more objects that implement the functions of the interface. Thus, the term "EJB client" will be used herein, instead of the term "EJB object," to avoid any confusion with a generic "object."

An "entity bean" is one type of EJB component used to model data in business transactions, the attributes of which are typically stored within a database. The term "persist" generally refers to the process of storing, updating, and deleting such attributes to or from a database. An entity bean may manage the persistence of its attributes, or it may delegate the responsibility to the EJB container in which it executes. An EJB client may explicitly request the entity bean, or the EJB container, to persist the entity bean's attributes. Alternatively, the entity bean or EJB container, as the case may be, may persist the attributes when there is a need, such as occurs when a second EJB client needs to access the attributes in the database.

A "session bean" is another type of EJB component. A session bean is used to manage a single client application's use of other EJB components. Like an entity bean, a session bean generally has attributes, but a session bean's attributes usually are not persisted to a database. A session bean may or may not participate in transactions.

Persons skilled in the art will appreciate that any operation that accesses a database consumes at least some quantity of available computing resources, thereby decreasing the resources available for other computing tasks. Thus, a computer program that frequently operates on attributes within a database can decrease computer performance significantly. Likewise, a computer program that operates on a database indirectly through one or more objects, such as an entity bean or container, can cause the same performance reduction. Consequently, programmers often store requested database operations in a temporary location, commonly referred to as a "cache," in order to minimize the number of database operations and improve a program's overall performance.

While the concept of "caching" operations is not new, there is much room for improvement in the implementation of caching mechanisms. For example, Gopalan Suresh Raj, *Enterprise JavaBeans,* Web Cornucopia, at http://members.tripod.com/gsraj/ejb (last updated Dec. 19, 1998), incorporated herein by reference, discloses a session bean that implements a simple caching mechanism. A session bean, however, usually is customized for a particular client application. Furthermore, many session beans are not designed to handle transaction processing.

Thus, the invention disclosed herein addresses the need in the art for a uniform caching mechanism that can manage transactions while minimizing the number of database operations required for any given client program. Particularly, this invention seeks to minimize the number of times that a computer program accesses a database to operate on an object's attributes stored therein.

These and other objects of the invention will be apparent to those skilled in the art from the following detailed description of a preferred embodiment of the invention.

SUMMARY OF THE INVENTION

The invention described in detail below controls the persistence of server component objects during a transaction, thereby minimizing the number of times that a program accesses a database. The invention also minimizes the number of operations needed. In particular, the invention caches the database operations required to persist server component objects until a client object program commits the transaction or until another object program needs to access the server component objects.

The invention comprises an improved container program that creates server component objects, associates each server component object with a transaction, maintains the server component objects in a cache, filters out unnecessary database operations, and then flushes the cache at the appropriate time so that a server component object is persisted only when a client program commits an associated transaction or another object program attempts to access the server component object.

BRIEF DESCRIPTION OF DRAWINGS

The novel features believed characteristic of the invention are set forth in the appended claims. The invention itself, however, as well as a preferred mode of use, further objectives and advantages thereof, will be understood best by reference to the following detailed description of an illustrative embodiment when read in conjunction with the accompanying drawings, wherein:

DETAILED DESCRIPTION OF THE PREFERRED EMBODIMENT

A person of ordinary skill in the art will appreciate that the present invention may be implemented in a variety of software and hardware configurations. It is believed, however, that the invention is described best as a computer program that configures and enables one or more general-purpose computers to implement the novel aspects of the invention. The term "computer" includes, without limitation, any machine that is capable of processing data and performing logic operations according to a predefined set of instructions. A "program" includes any such predefined set of instructions capable of directing a computer to process data or perform logic operations. While the invention was designed to implement an EJB container, the principles and processes described below are applicable generally to any program designed to manage or control the process of persisting objects to a database. Consequently, these principles and processes are described in generic terms rather than terms specific to the EJB architecture.

As used herein, the term "client object program" refers to any object program that has the capacity to communicate with a container program.

The term "container program" refers to any program that must execute within a server program and is capable of executing an object program.

The term "create request" refers to any communication that a client object program sends to a container program indicating that the client object program wants container program to create a server component object.

The term "finder object program" refers to any object program that can be used to identify and locate other object programs.

The term "load request" refers to any communication that a client object program sends to a container program indicating that the client object program wants the container program to retrieve a server component object persisted in memory.

The term "object program" refers to any computer program that implements an object-oriented design, as described above.

The term "remove request" refers to any communication that a client object program sends to a container program indicating that the client object program wants the container program to remove, destroy, or otherwise release memory occupied by a server component object.

The term "server component object" refers to any object program that must execute within a container program.

The term "store request" refers to any communication that a client object program sends to a container program indicating that the client object program wants the container program to persist a server component object.

Figure 1:
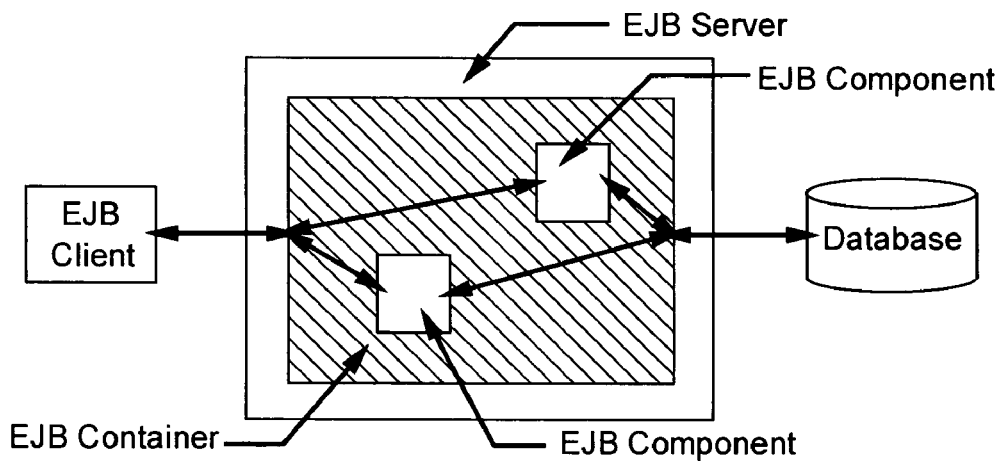
FIG. 1 depicts a typical EJB system architecture.
Figure 2:
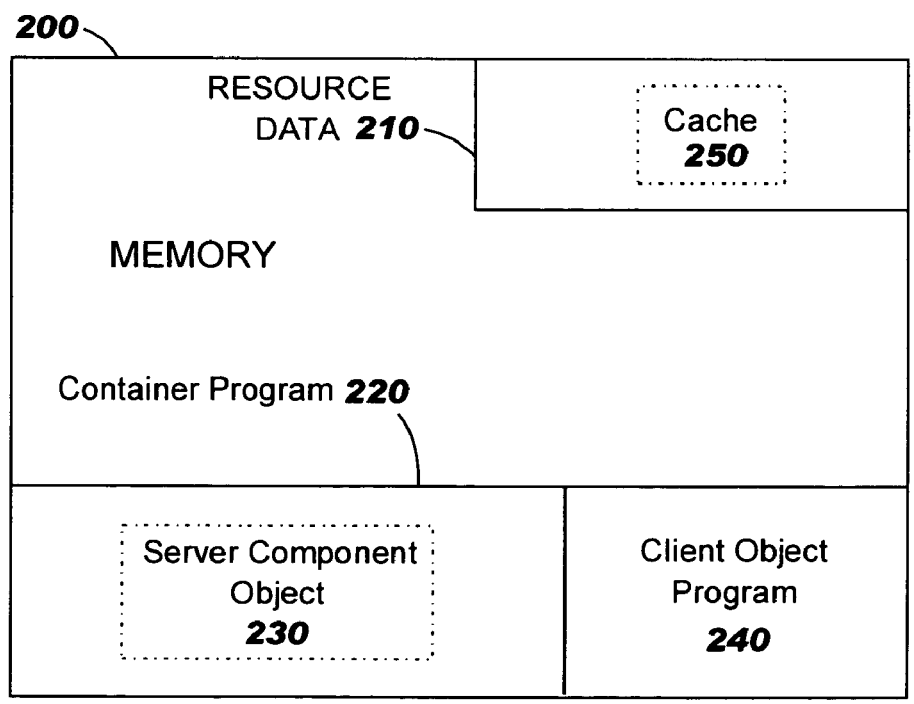
FIG. 2 represents the internal configuration of a computer having the computer program of the present invention loaded into memory.

The internal configuration of a computer, including connection and orientation of the processor, memory, and input/output devices, is well known in the art. FIG. 2 represents the internal configuration of a computer having the computer program of the present invention loaded into memory 200. A "memory," as the term is used herein, is any medium in which a computer can store a computer program or data for any duration, including without limitation electrical circuits, magnetic disks, and optical disks. The computer program of the present invention is depicted as container program 220, which contains at least one server component object 230. Container program 220 also interfaces with client object program 240 and enables client object program 240 to communicate indirectly with server component object 230. Memory 200 is only illustrative of memory within a computer and is not meant as a limitation. Memory 200 also contains resource data 210, which includes cache 250. The present invention may interface with resource data 210 and cache 250 through memory 200.

In alternative embodiments, container program 220, server component object 230, and client object program 240 can be stored in the memory of other computers. Storing container program 220 in the memory of other computers allows the processor workload to be distributed across a plurality of processors instead of a single processor. Further configurations of container program 220, server component object 230, and client object program 240 across various multiple memories and processors are known by persons skilled in the art.

Figure 3:
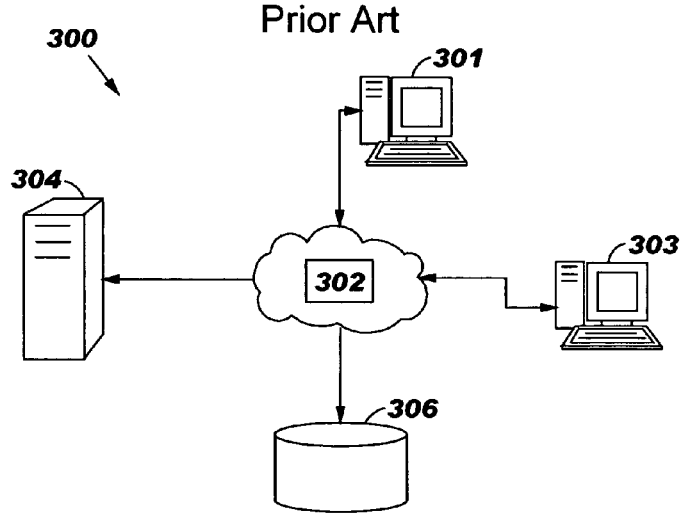
FIG. 3 illustrates a common prior art architecture for connecting various hardware devices to create a network for transferring data.

FIG. 3 illustrates a common prior art architecture for connecting various hardware devices to create a network for transferring data. Computer network 300 comprises local computer 301 electrically coupled to network connection 302. In FIG. 3, local computer 301 is coupled electrically to remote computer 303 via network connection 302. Local computer 301 also is coupled electrically to server computer 304 and persistent storage 306 via network connection 302. Network connection 302 may be a simple local area network (LAN) or may be a larger wide area network (WAN), such as the Internet. While computer network 300 depicted in FIG. 3 is intended to represent a possible network architecture, it is not intended to represent an architectural limitation.

Container program 220, server component object 230, or client object program 240 described herein can be stored within memory 200 of any computer depicted in FIG. 3. Alternatively, container program 220, server component object 230, or client object program 240 can be stored in an external storage device such as persistent storage 306, or a removable disk such as a CD-ROM (not pictured).

Figure 4:
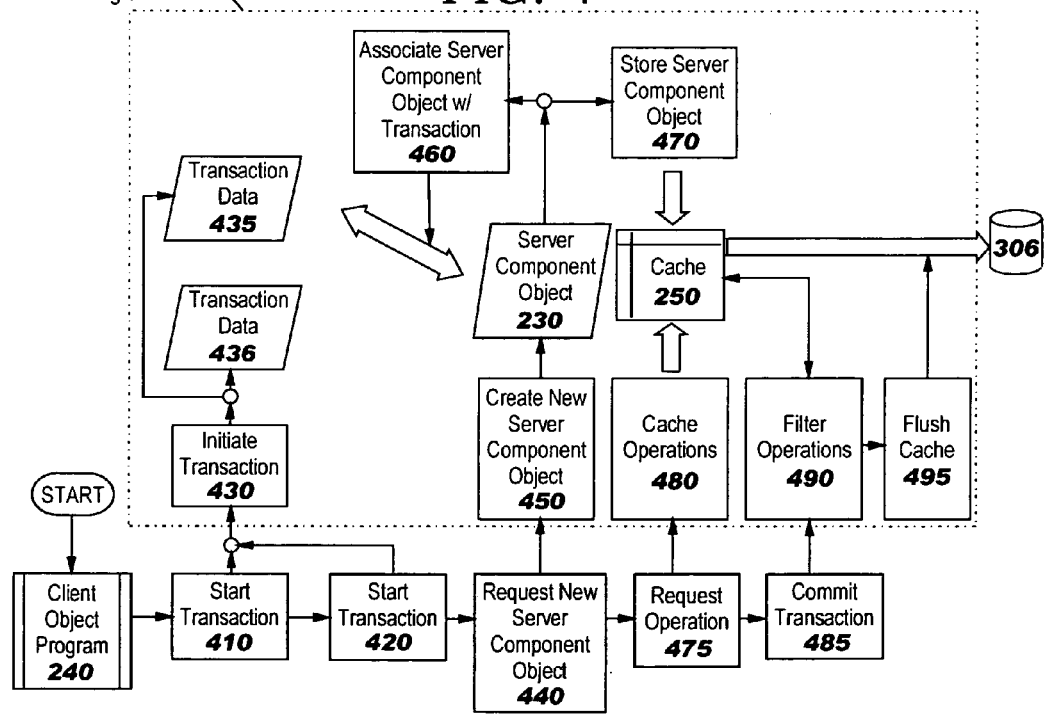
FIG. 4 illustrates a container program and a client object program executing in parallel to process a transaction.

Container program 220 controls the persistence of server component object 230 during a transaction initiated by client object program 240. FIG. 4 illustrates container program 220 and client object program 240 executing in parallel to process a transaction. FIG. 4 is not intended to represent the entire functional scope of container program 220 or client object program 240, and a person of skill in the art will appreciate that container program 220 and client object program 240 may process data not depicted in FIG. 4.

Referring to FIG. 4 for illustration, client object program 240 requests container program 220 to start a transaction (410), and may request multiple transactions (420). Responsive to receiving a request from client object program 240 to start a transaction (410), container program 220 initiates transaction data 435 (430). Although FIG. 4 and the description above illustrate container program 220 managing the transaction data, other transaction management configurations are possible, including a configuration in which client object program 240 manages the transaction data rather than container program 220. But continuing with the configuration depicted in FIG. 4, if client object program 240 makes more than one request to start a transaction (420), then container program 220 initiates transaction data, such as transaction data 436, for each such request.

Then, at some point during a transaction, client object program 240 requests container program 220 to create a server component object to represent transaction data, or some portion thereof (440). Responsive to the client object program 240 request (440), container program 220 creates server component object 230 (450) and associates server component object 230 with the appropriate transaction (460). Techniques for associating transactions and objects, such as the use of primary keys and the like, are well known in the art and thus not described here. For illustration purposes, this discussion assumes that transaction data 435 represents the appropriate transaction. Consequently, container program 220 creates an association between transaction data 435 and server component object 230 (as indicated by the block arrow). Prior art container programs then would persist server component object 230 in database 306. Container program 220, however, stores server component object in cache 250. Similarly, if client object program 240 subsequently requests operations on server component object 230, a prior art container program would execute the operations immediately, and corresponding changes to server component object 230 also would be persisted to database 306 immediately. But container program 220 stores the operations in cache 250. Typical examples of such operations include requests to remove, store, or load server component object 230.

Figure 5:
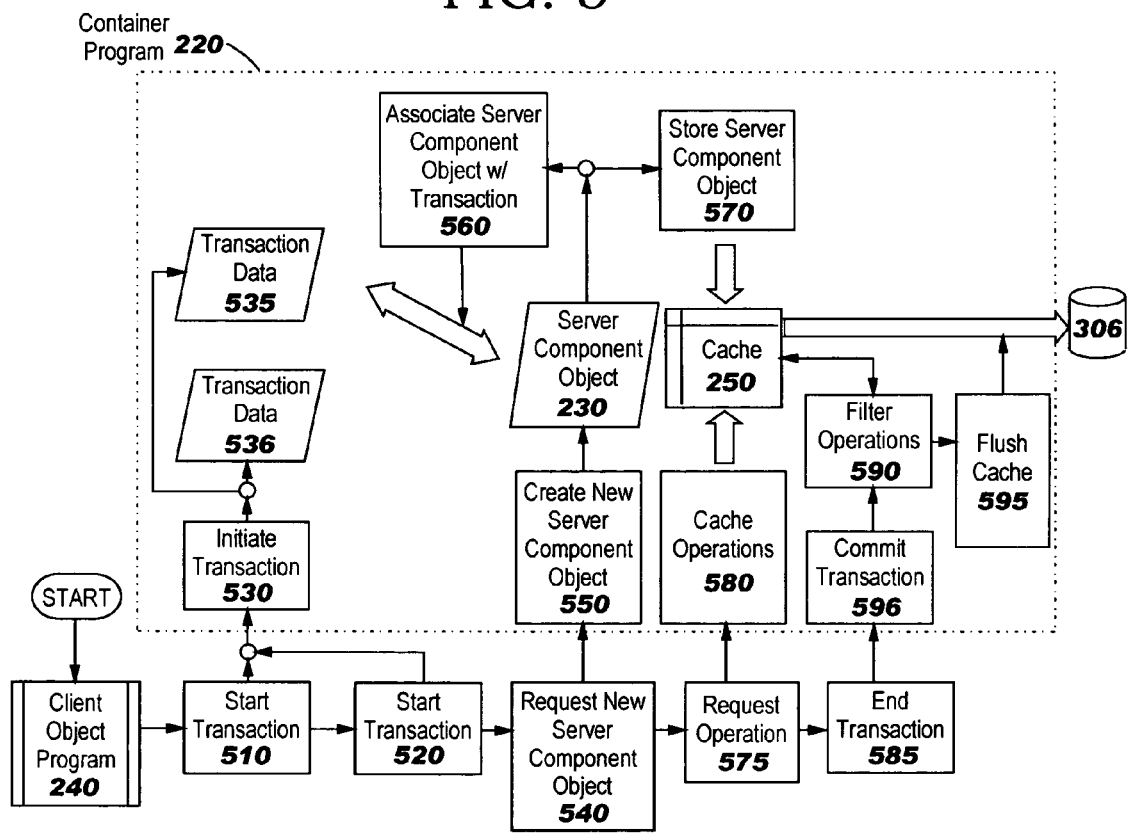
FIG. 5 illustrates an alternative embodiment of a container program and a client object program executing in parallel to process a transaction.
Figure 6:
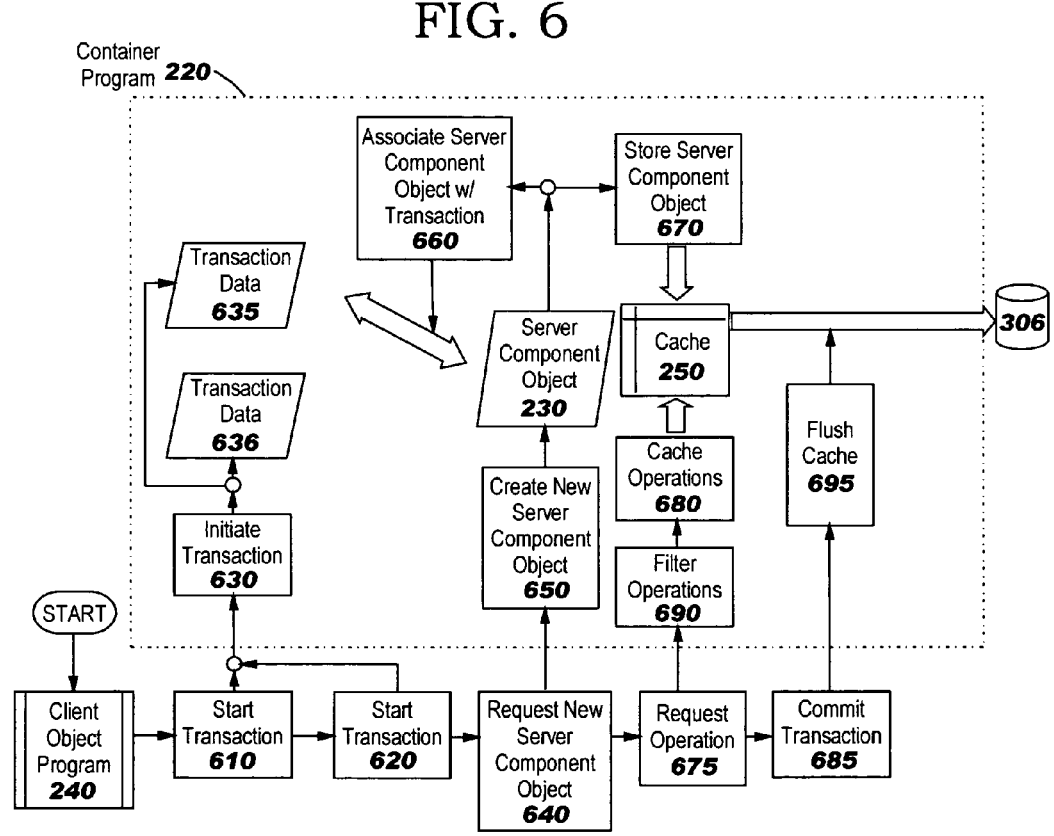
FIG. 6 illustrates an alternative embodiment of a container program and a client object program executing in parallel to process a transaction.

As illustrated in FIG. 4, when client object program 240 subsequently commits the transaction associated with server component object 230 (485), container program 220 filters the operations stored in cache 250 (490) and flushes cache 250 (495), so that the operations then are executed and server component object is persisted to database 306 accordingly. FIG. 5 illustrates an alternative embodiment wherein client program object 240 requests container program 220 to commit the transaction, and then container program 220 commits the transaction as requested. FIG. 6 illustrates yet another embodiment wherein container program filters the operations before storing them in cache 250.

Figure 7:
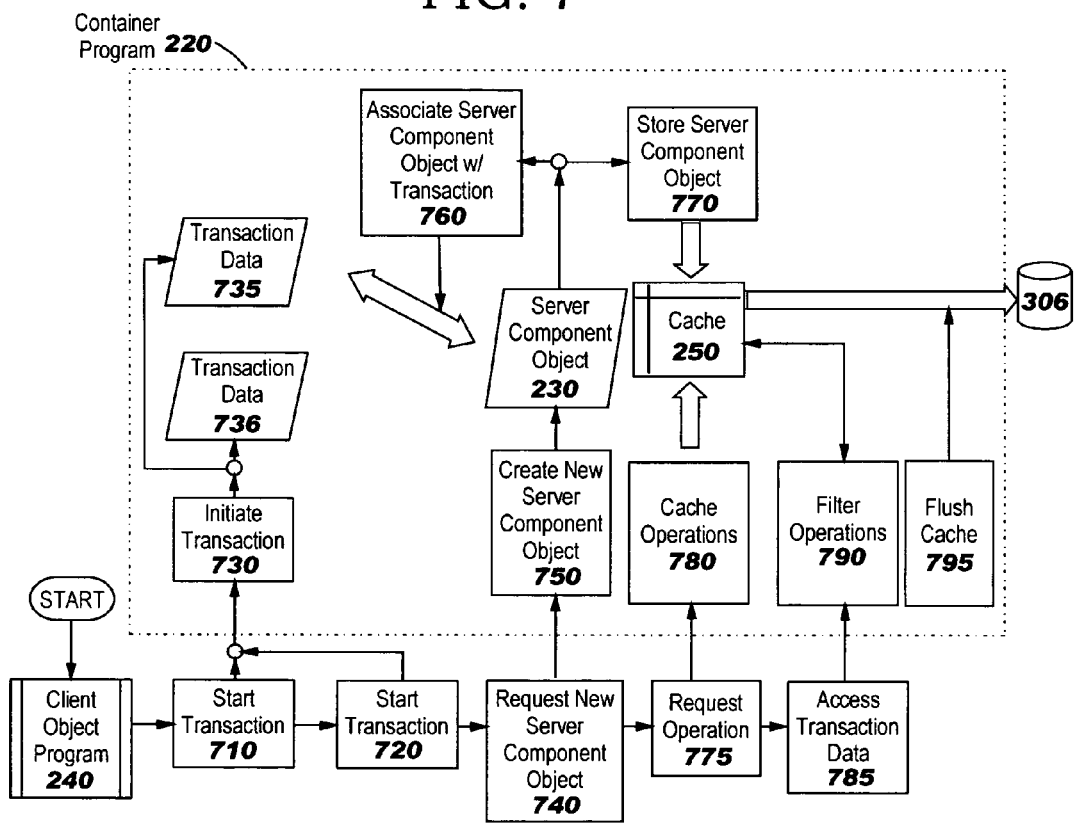
FIG. 7 illustrates an alternative embodiment of a container program and a client object program executing in parallel to process a transaction.
Figure 8:
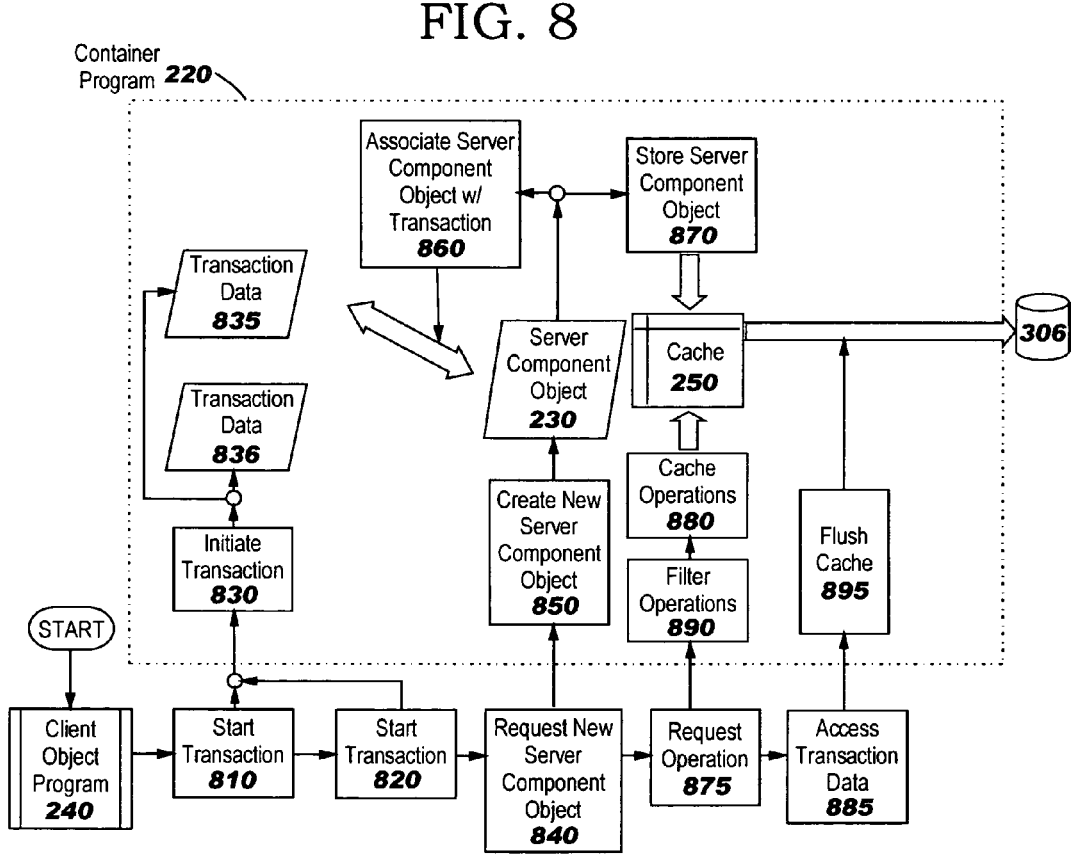
FIG. 8 illustrates an alternative embodiment of a container program and a client object program executing in parallel to process a transaction.

FIG. 7 illustrates an embodiment of the present invention wherein client object program 240 requests access to transaction data 435 through server component object 230 (785), rather than committing a transaction. Similarly, the step of committing a transaction in FIG. 6 is replaced in FIG. 8 with the step of requesting access to transaction data 435 through server component object 230. In alternative embodiments, client object program 240 may use a finder object program to access transaction data 435, other client object programs (not pictured) may request access to transaction data 435, or other client object programs may use a finder object program to access transaction data 435. As FIG. 7 and FIG. 8 illustrate, the rest of the invention remains the same as that illustrated in FIG. 4 and FIG. 6, which are described in detail above, and the process need not be described again here.

In the embodiments depicted in FIG. 4 through FIG. 8, container program 220 implements the filtering and flushing processes substantially as described below and illustrated in the accompanying drawings.

In the preferred embodiment, container program 220 identifies server component objects by transaction, type, and primary key. FIG. 9 through FIG. 12 illustrate the preferred process that container program 220 implements to filter certain operations on the same server component object that are either unnecessary or would produce inconsistent results. In particular FIG. 9 through FIG. 12 illustrate how container program 220 filters requests from client object program 240 to create, remove, store, and load a server component object. These illustrations and the following description also assume that client object program 240 is the only client object program sending requests to container program 220, that client object program 240 has requested container program 220 to create server component object 230, and that container program 220 has stored this request in cache 250, as described above and illustrated in the accompanying figures. The following description also assumes that transaction data 435 is the only relevant transaction and that server component object 230 is the only server component object associated with transaction data 435. These assumptions are made for illustration purposes only, and the ability to apply the same general processes to more complex scenarios including multiple transactions and multiple server component objects is believed to be within the capacity of a person of ordinary skill in the art. Finally, the following description assumes that server component objects are identified by object type and primary key values, but other techniques for identifying server component objects are within the ordinary skill of a person trained in the art and such a person readily can apply these other techniques to the same process.

Figure 9:
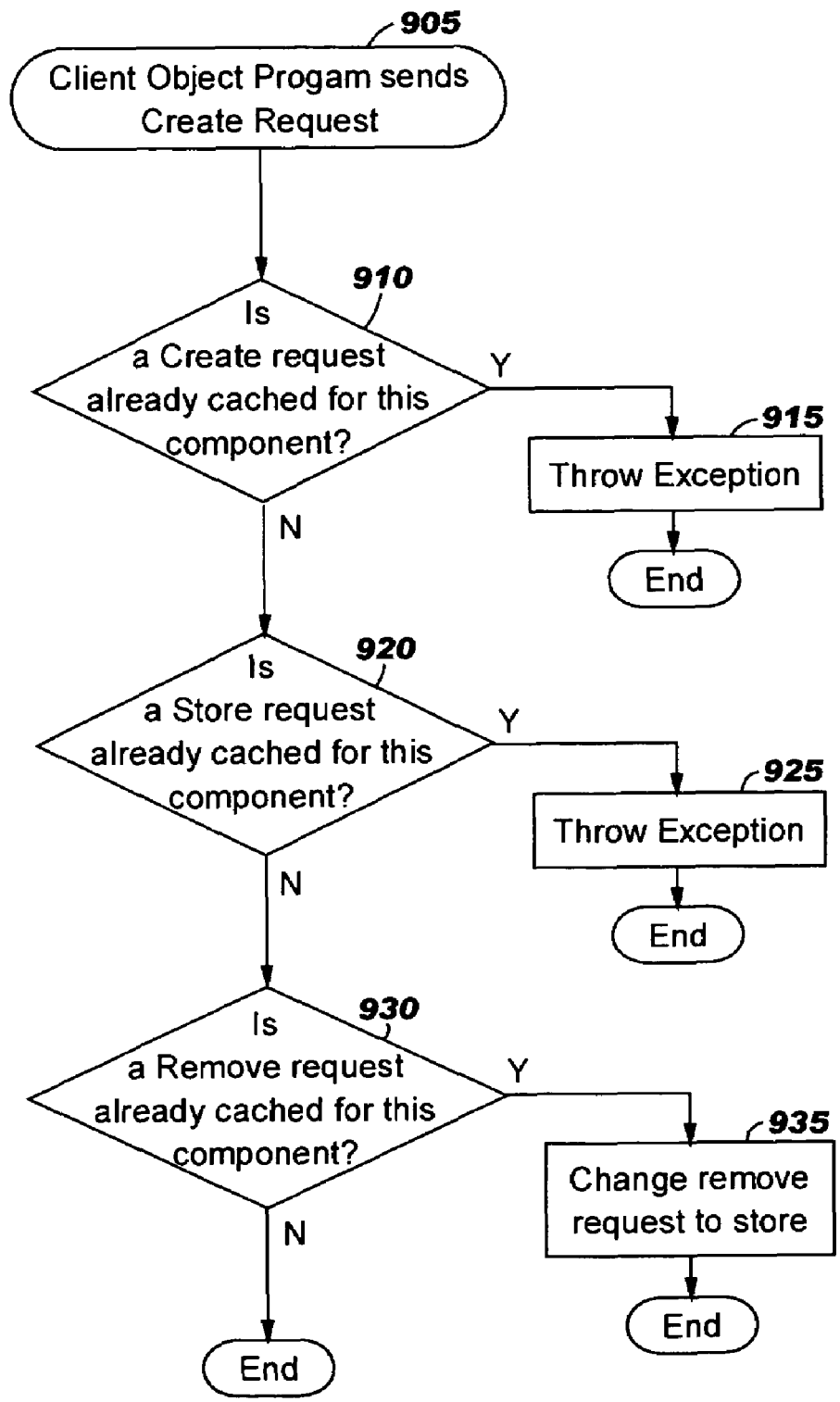
FIG. 9 illustrates the preferred process for filtering create requests for a server component object.

FIG. 9 illustrates the process that container program 220 uses to filter a request from client object program 240 to create server component object 230. Container program 220 first determines if there is already a request to create server component object 230 in the cache (910). Such a request implies that client object program 240 is attempting to create the same server component object twice. Consequently, if there is such a request, then container program 220 throws an exception back to client object program 240 indicating an error (915). If there is not such a request, then container program 220 determines if there is a request to store server component object 230 (920). Again, such a request implies that client object program 240 is attempting to create the same server component object twice, and container program 220 throws an exception to client object program 240 indicating an error (925). If client object program 240 has not requested to store the same server component object already, then container program 220 determines if a request to remove server component object 230 is in cache 250 (930). If such a request is in cache 250, then container program 220 changes the request to remove to a request to store server component object 230. Changing the remove request to a store request eliminates the unnecessary operations required to remove server component object 230 and then subsequently re-create the same server component object. If, however, cache 250 does not contain a request to remove server component object 230, then container program 220 assumes the request is necessary and proper. Container program 220 and client object program 240 then continue to operate as described above and illustrated in FIG. 4 through FIG. 8, filtering additional requests as needed.

Figure 10:
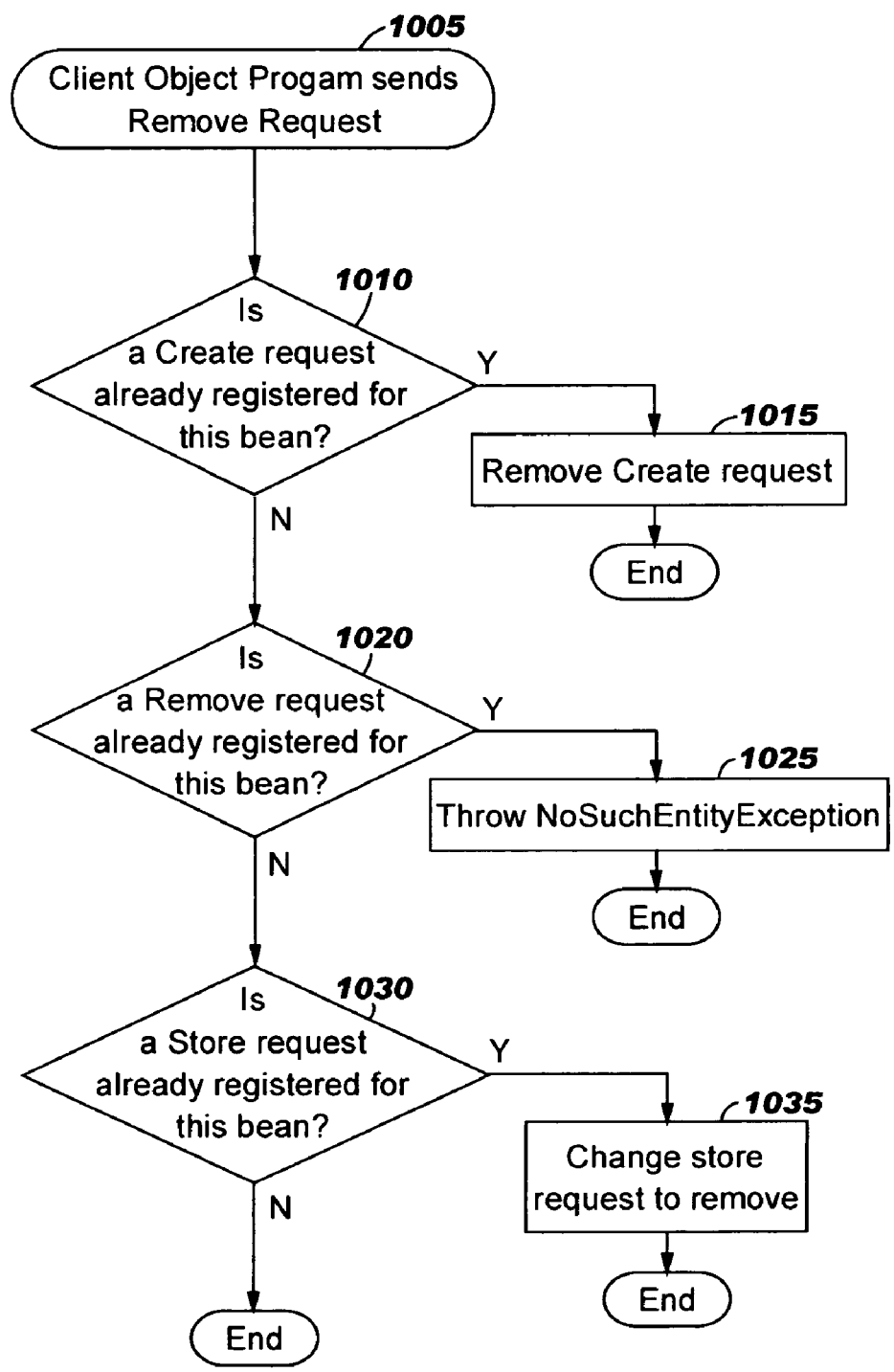
FIG. 10 illustrates the preferred process for filtering remove requests for a server component object.

FIG. 10 illustrates the process that container program 220 uses to filter a request from client object program 240 to remove server component object 230. Container program 220 first determines if there is already a request to create server component object 230 in the cache (1010). If there is such a request, then container program 220 removes the request to remove server component object 230 from cache 250 (1015). If there is not such a request, then container program 220 determines if there is a request to remove server component object 230 (1020). If there is such a request, then container program 220 throws an exception to client object 240 indicating that server component object 230 does not exist (1025). If client object program 240 has not requested that server component object be removed, then container program 220 determines if a request to store server component object 230 is in cache 250 (1030). If such a request is in cache 250, then container program 220 changes the request to store to a request to remove server component object 230. Changing the store request to a remove request eliminates the unnecessary operations required to create server component object 230 and then subsequently remove the same server component object. If, however, cache 250 does not contain a request to store server component object 230, then container program 220 assumes the request is necessary and proper. Container program 220 and client object program 240 then continue to operate as described above and illustrated in FIG. 4 through FIG. 8, filtering additional requests as needed.

Figure 11:
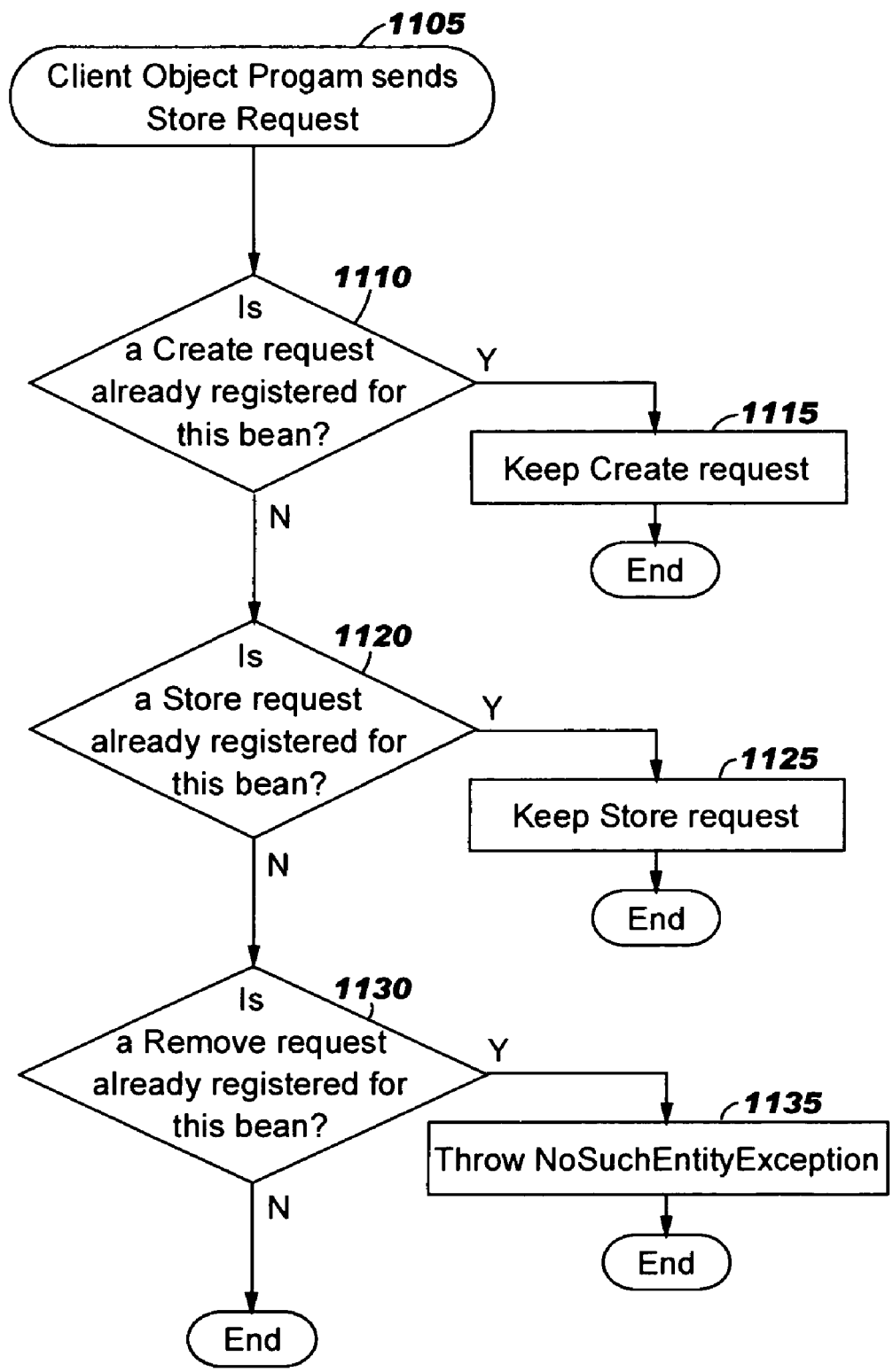
FIG. 11 illustrates the preferred process for filtering store requests for a server component object.

FIG. 11 illustrates the process that container program 220 uses to filter a request from client object program 240 to store server component object 230. Container program 220 first determines if there is already a request to create server component object 230 in cache 250 (1110). If there is such a request, then container program 220 preserves the request to create server component object 230 in cache 250, but does not store the request to store server component object 230 in cache 250 (1115). The operation of creating server component object 230 includes storing server component object 230, so ignoring the request to store the same server component object eliminates the need to execute the same operation twice. If there is not such a request, then container program 220 determines if there is a request to store server component object 230 (1120) in cache 250. If there is such a request, then container program 220 again ignores the new request to store server component object 230 in order to avoid executing the same operation twice (1125). If cache 250 does not contain a request to store server component object 230, then container program 220 determines if cache 250 contains a request to remove server component object 230 (1130). If such a request is in cache 250, then container program 220 throws an exception to client object program 240 indicating that server component object 230 does not exist (1135). If, however, cache 250 does not contain a request to remove server component object 230, then container program 220 assumes the request is necessary and proper. Container program 220 and client object program 240 then continue to operate as described above and illustrated in FIG. 4 through FIG. 8, filtering additional requests as needed.

Figure 12:
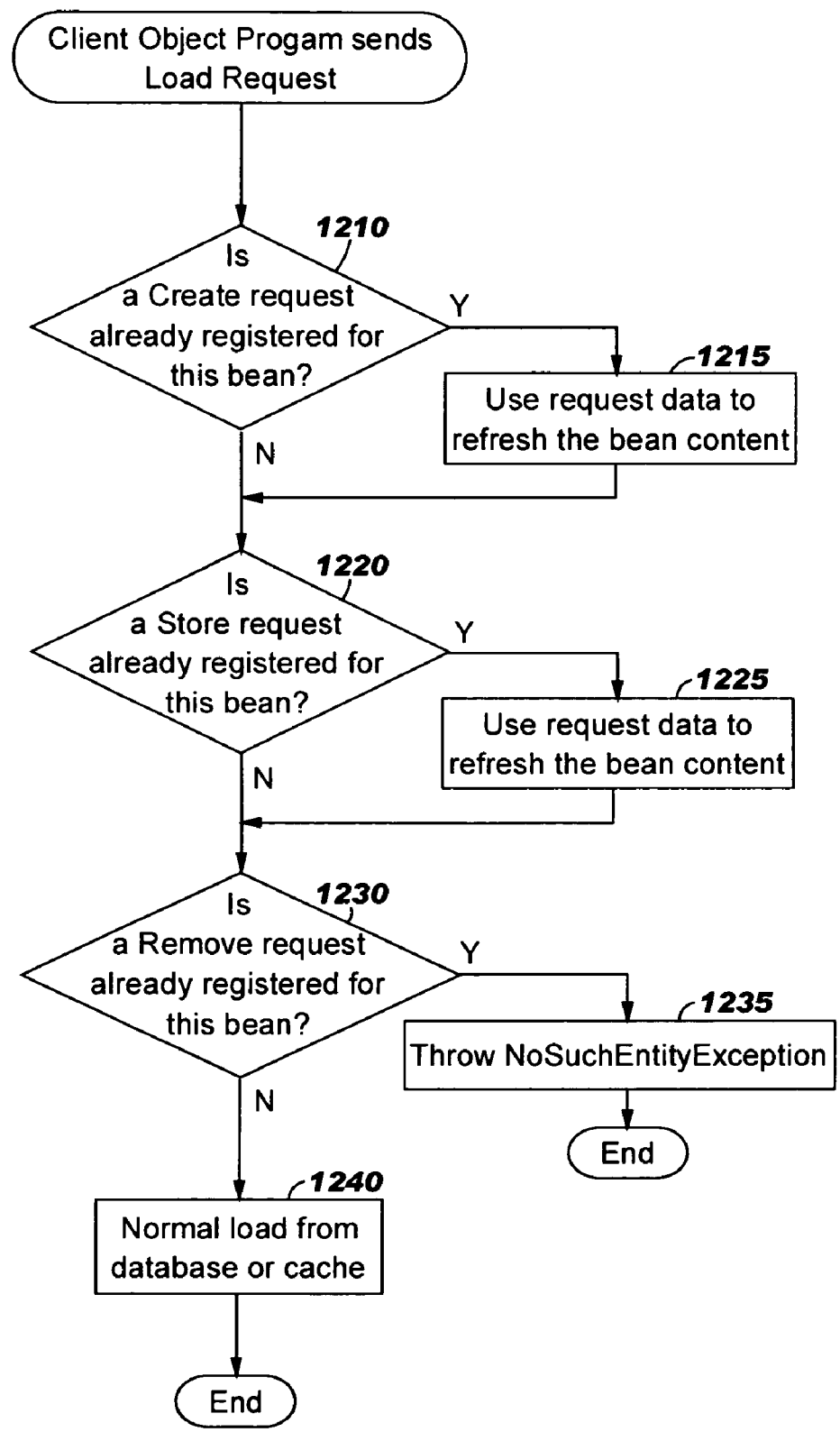
FIG. 12 illustrates the preferred process for filtering load requests for a server component object.

FIG. 12 illustrates the process that container program 220 uses to filter a request from client object program 240 to load server component object 230. Container program 220 first determines if there is already a request to create server component object 230 in cache 250 (1210). If there is such a request, then container program 220 uses the data associated with the create request to update server component object 230 (1215). After updating server component object 230, or if there is not such a request in cache 250, then container program 220 determines if cache 250 contains a request to store server component object 230 (1220). If there is such a request in cache 250, then container program 220 uses the data associated with the store request to update server component object 230. After updating server component object 230, or if cache 250 does not contain a request to store server component object 230, then container program 220 determines if cache 250 contains a request to remove server component object 230 (1230). If such a request is in cache 250, then container program 220 throws an exception to client object program 240 indicating that server component object 230 does not exist (1235). If, however, cache 250 does not contain a request to remove server component object 230, then container program 220 assumes the request is necessary and proper and loads server component object 230 from database 306. Container program 220 and client object program 240 then continue to operate as described above and illustrated in FIG. 4 through FIG. 8, filtering additional requests as needed.

As described above and illustrated in FIG. 4 through FIG. 8, container program 220 flushes cache 250 when one of two conditions is met: first, when client object program 240 explicitly indicates that the transaction is complete; or second, when container program 220 determines that flushing cache 250 is necessary in order to provide consistent data to client object program 240 or other client object programs that access server component object 230.

Figure 13:
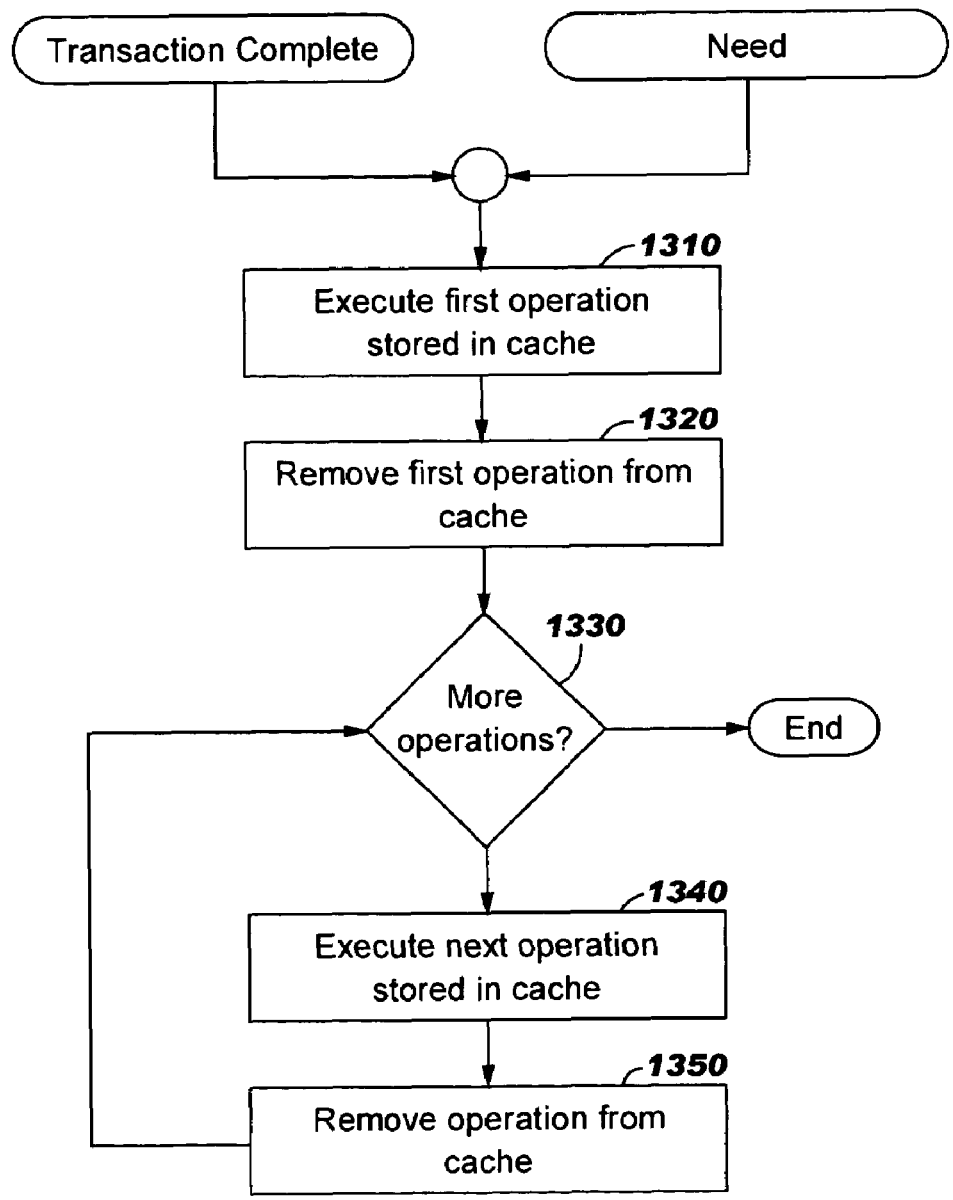
FIG. 13 illustrates the preferred process for flushing the cache to execute deferred operations.

Referring to FIG. 13 for illustration, when either of these conditions is met, container program 220 executes the operations in the sequence that the operations were stored in cache 250, and removes each operation from cache 250 after executing the operation (1310 through 1350). Container program 220 and client object program 240 then continue to operate as described above and illustrated in FIG. 4 through FIG. 12, flushing cache 250 whenever a transaction is completed or when there is a need.

Although only one container program, one server component object, and one client object program are represented in the figures and corresponding descriptions above, a person of ordinary skill in the art will be able to apply the same principles and processes to more than one of each.

A preferred form of the invention has been shown in the drawings and described above, but variations in the preferred form will be apparent to those skilled in the art. The preceding description is for illustration purposes only, and the invention should not be construed as limited to the specific form shown and described. The scope of the invention should be limited only by the language of the following claims.

What is claimed is:

1. A process to defer a persistence of a server component object during a transaction on a database, the process comprising:

using an improved container program that creates a plurality of server component objects, associates each of the plurality of server component objects with the transaction, maintains each of the plurality of server component objects in a cache, filters out any unnecessary database operations, and then flushes the cache at an appropriate time so that a server component object is persisted only when a client program commits an associated transaction or an object program attempts to access the server component object, performing the steps of:

receiving a request from the client object program to initiate the transaction;

storing the request from the client object program to initiate the transaction within the cache;

receiving a request from the client object program to create a server component object associated with the transaction;

storing the request from the client object program to create the server component object associated with the transaction within the cache;

receiving a request from the client object program to commit the transaction; and responsive to the client object program's request to commit the transaction, initiating the transaction stored in the cache, persisting the server component object associated with the transaction to the database, committing the transaction, removing the request to initiate the transaction from the cache, and removing the server component object associated with the transaction from the cache;

wherein all operations on the database related to the transaction are deferred until the client object program completes the transaction;

wherein the persistence of the server component object during the transaction is controlled minimizing a number of times that the database is accessed;

wherein a plurality of database operations required to persist a plurality of server component objects are cached until the client object program commits the associated transaction or until the object program attempts to access the server component object.

2. A process to defer a persistence of a server component object during a transaction on a database, the process comprising:

using an improved container program that creates a plurality of server component objects, associates each of the plurality of server component objects with the transaction, maintains each of the plurality of server component objects in a cache, filters out any unnecessary database operations, and then flushes the cache at an appropriate time so that a server component object is persisted only when a client program commits an associated transaction or an object program attempts to access the server component object, performing the steps of:

receiving a request from the client object program to initiate the transaction;

storing the request from the client object program to initiate the transaction within the cache;

receiving a request from the client object program to create a server component object associated with the transaction;

storing the request from the client object program to create the server component object associated with the transaction within the cache;

determining that the client object program will access the server component object; and responsive to determining that the client object program will access the server component object, initiating the transaction stored in the cache, persisting the server component object associated with the transaction to the database, removing the request to initiate the transaction from the cache, and removing the server component object associated with the transaction from the cache;

wherein all operations on the database related to the transaction are deferred until the client object program will access the server component object.

3. The process of claim 2 further comprising:

determining that a finder object program will access the server component object; and responsive to determining that the finder object program will access the server component object, initiating the transaction stored in the cache, persisting the server component object associated with the transaction to the database, removing the request to initiate the transaction from the cache, and removing the server component object associated with the transaction from the cache;

wherein all operations on the database related to the transaction are deferred until at least one finder object program will access the server component object.

* * * * *